July 30, 1968     D. N. HUMPHRIES ET AL     3,394,964

REVOLVING TRANSPORTATION SEAT

Filed Nov. 1, 1966     4 Sheets-Sheet 1

INVENTORS
Douglas N. Humphries
Oscar J. Nelson
William Hamelink

BY Dawson, Tilton, Fallon
Lungmus, and Alexander
ATTORNEYS

INVENTORS
Douglas N. Humphries
Oscar J. Nelson
William Hamelink
BY Dawson, Tilton, Fallon,
Lungmus, and Alexander
ATTORNEYS July 30, 1968 D. N. HUMPHRIES ET AL 3,394,964
REVOLVING TRANSPORTATION SEAT Filed Nov. 1, 1966 4 Sheets-Sheet 3

INVENTORS
Douglas N. Humphries
Oscar J. Nelson
William Hamelink
BY Dawson, Tilton, Fallon,
Bungmus, and Alexander.
ATTORNEYS

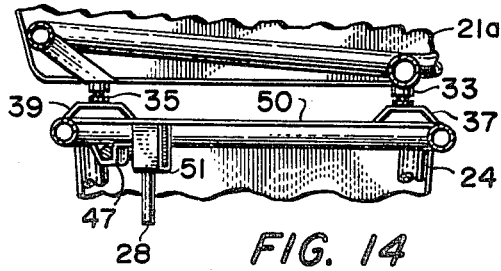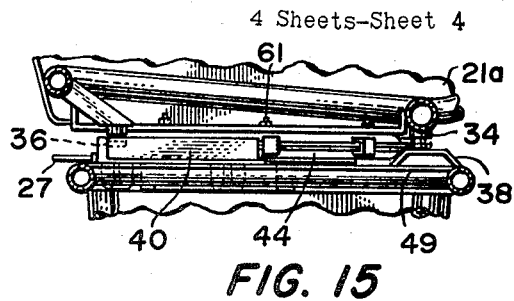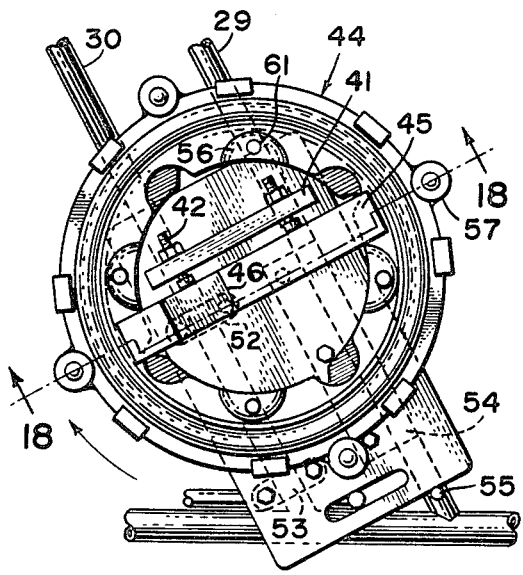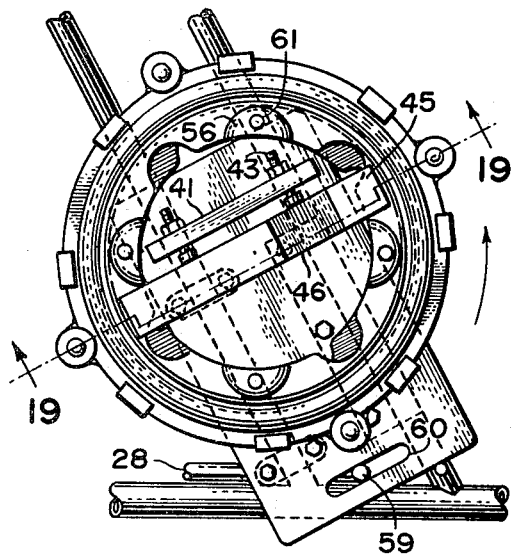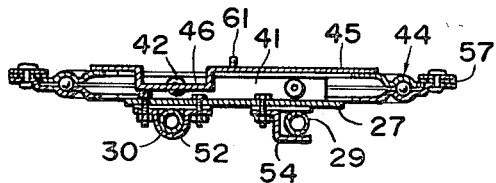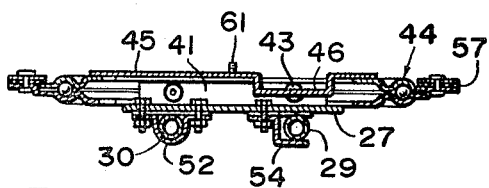

United States Patent Office 3,394,964
Patented July 30, 1968

3,394,964
REVOLVING TRANSPORTATION SEAT
Douglas N. Humphries, Oscar J. Nelson, and William Hamelink, Grand Rapids, Mich., assignors to American Seating Company, Grand Rapids, Mich., a corporation of Delaware
Filed Nov. 1, 1966, Ser. No. 591,199
7 Claims. (Cl. 297—240)

ABSTRACT OF THE DISCLOSURE

A revolving transportation seat is provided with a base frame having guide means extending diagonally across the base, a carriage being mounted on the guide means and a seat frame rotatably mounted on the carriage. A lever is pivotally mounted on the base frame and connected to the carriage for moving the carriage on the diagonal guide means and latch means are provided for locking and holding the seat solidly in position in either its forward or backward locations.

---

This invention relates to a revolving transportation seat useful for buses, railway passenger cars, and other vehicles.

An object of the invention is to provide a revolving seat which may be moved with a minimum of effort and at an angle from the wall of the vehicle so that the seat can be revolved readily to face in opposite directions. Yet another object is to provide a seat structure in which the seat support slides away from the wall at an angle and to a point where the seat can be revolved readily, and then the support is slid back to the wall at the same angle, thus permitting the use of a lever for effective movement of the seat support to the desired positions. A still further object is to provide a seat structure and means for moving the seat support at an angle from the wall to make full usage of the space between the seats while requiring less room between the seats. A still further object is to provide a structure in which the seat is secured in place to provide a solid support when moved to face in either forward or backward directions. Other specific objects and advantages will appear as the specification proceeds.

The invention is shown in an illustrative embodiment by the accompanying drawings, in which—

Figure 1:
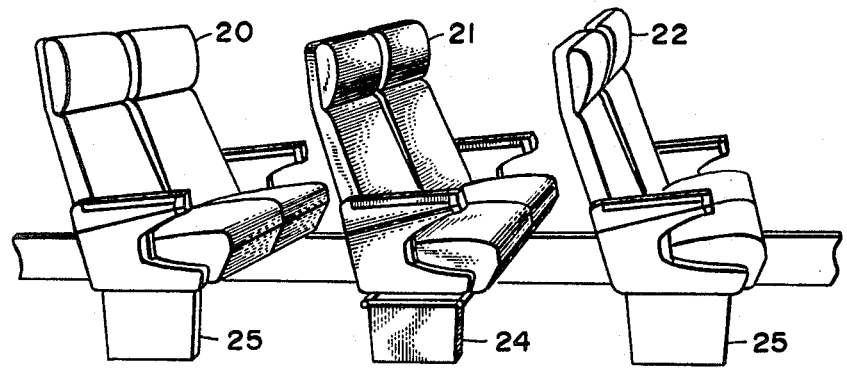
Figure 2:
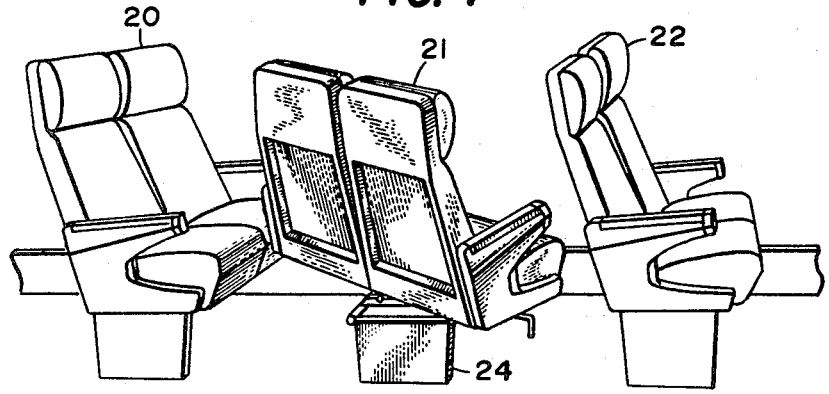
Figure 3:
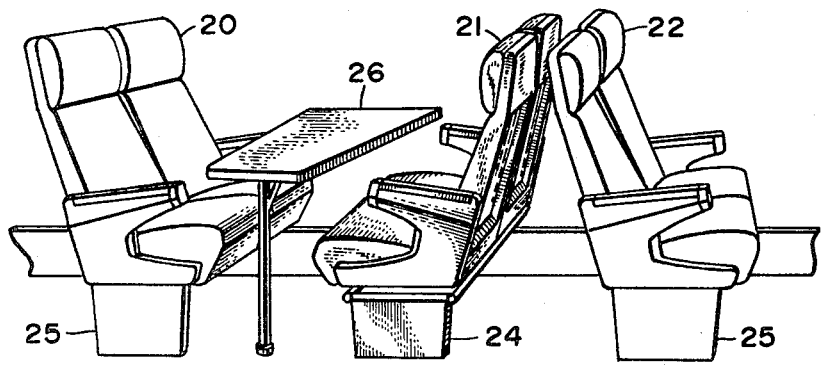
Figure 4:
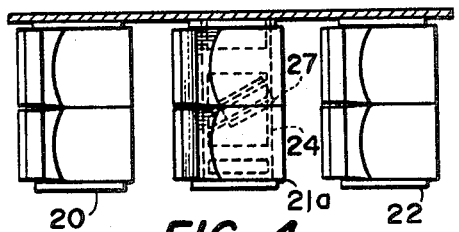
Figure 5:
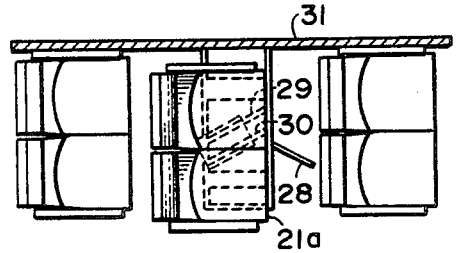
Figure 6:
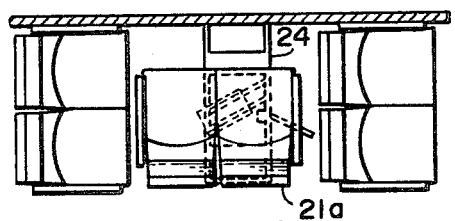
Figure 7:
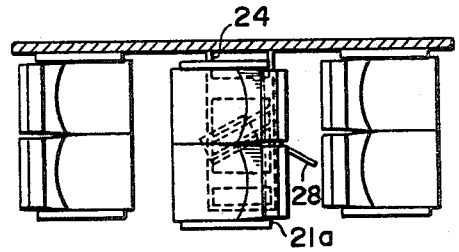
Figure 8:
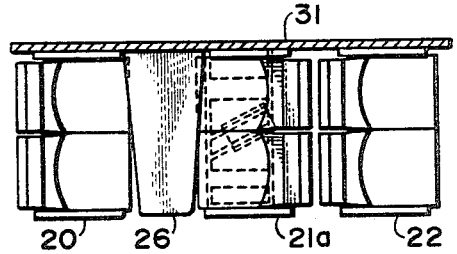
Figure 9:
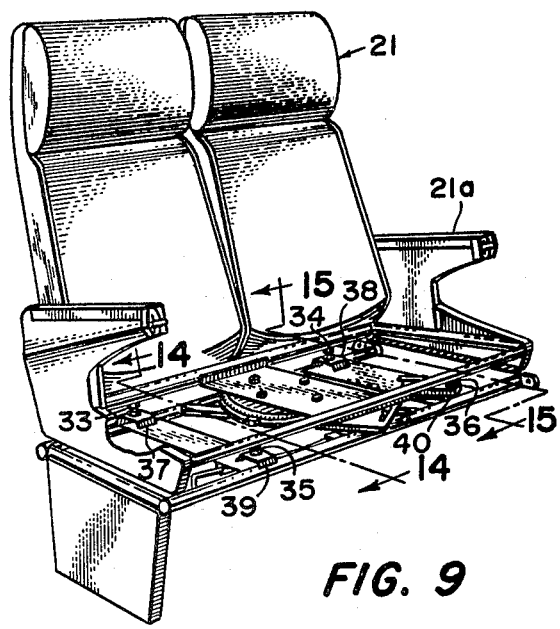
Figure 10:
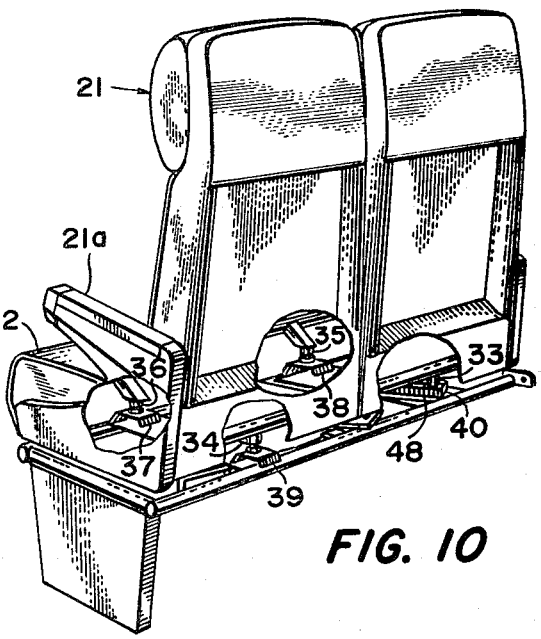
Figure 12:
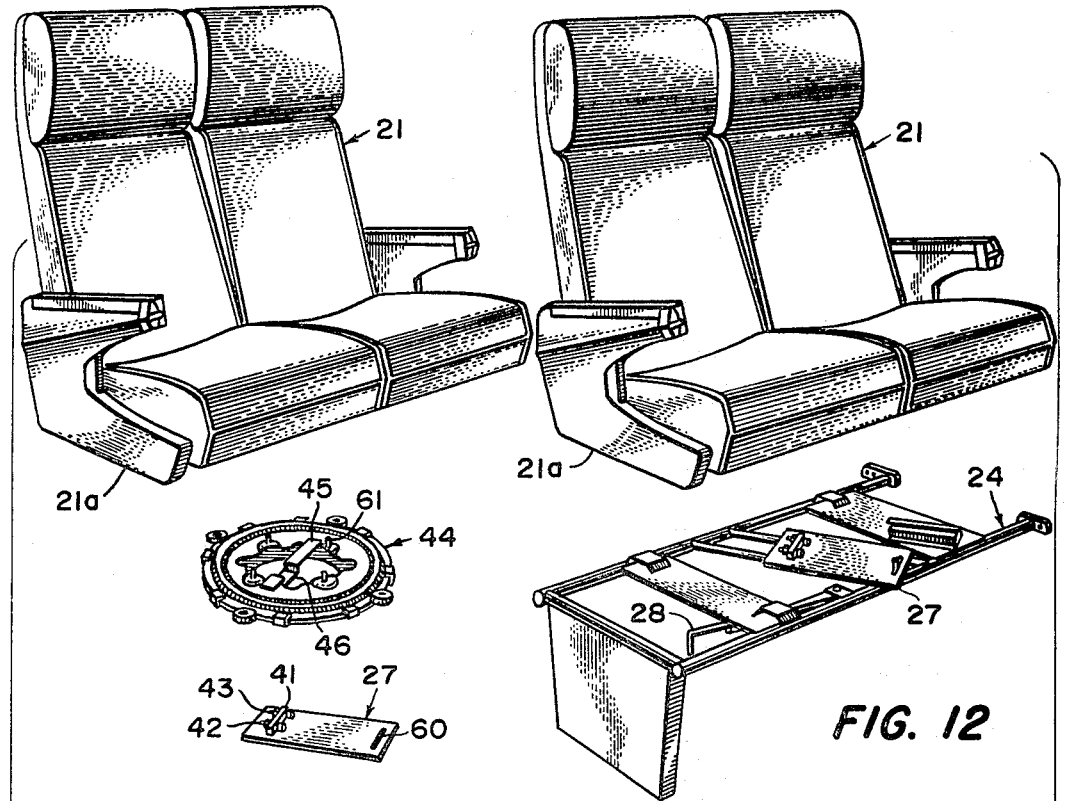
Figures 11, 13:
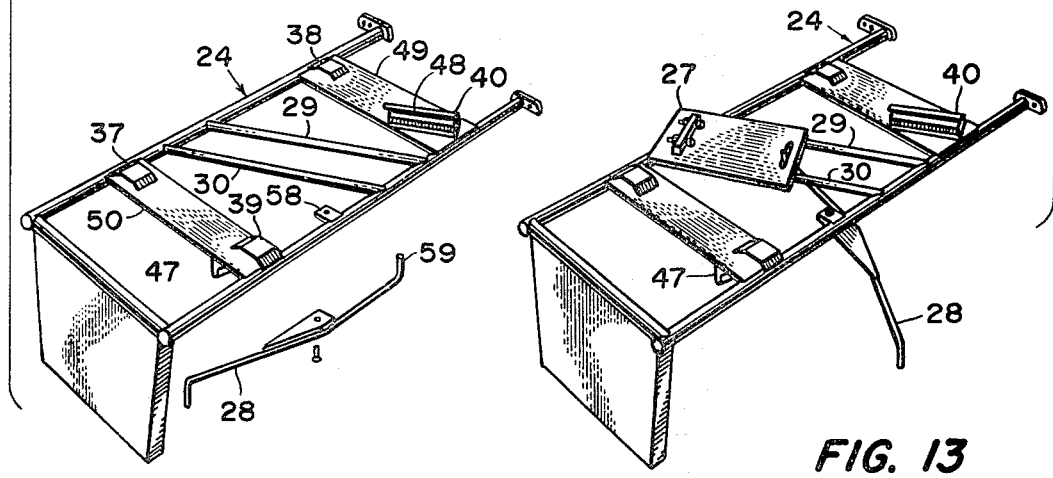

FIG. 1 is a perspective view of the left side of a bus interior showing three seats in a row facing in the same direction; FIG. 2, a perspective view of the same row of seats with the center seat partially revolved; FIG. 3, a perspective view of the same grouping of seats shown in FIG. 1 but with the center seat turned completely around and with a table between the seats; FIG. 4, a top plan view of the row of seats shown in FIG. 1, all of the seats facing in the same direction; FIG. 5, a top plan view similar to FIG. 4 but showing the center seat moved laterally from the wall; FIG. 6, a view similar to FIG. 5 but showing the seat moved to a halfway position; FIG. 7, a view similar to FIG. 6 but showing the seat revolved to face the seat behind it but with the seat still spaced from the wall; FIG. 8, a view similar to FIG. 6 but showing the middle seat moved inwardly against the wall and with a table placed between the rearmost seats; FIG. 9, a perspective view of the revolving seat in the normal position shown in FIG. 1 but with the seat cushions removed; FIG. 10, a perspective view with the seat revolved to the position shown in FIG. 8, the view being taken from the rear of the revolved seat; FIG. 11, a perspective exploded view of the seat in its normal forward position; FIG. 12, a perspective exploded view of the seat with the component parts shown in spaced relation; FIG. 13, a perspective view of the base support for the seat; FIG. 14, a sectional view, the section being taken as indicated at line 14—14 of FIG. 9; FIG. 15, a sectional view, the section being taken as indicated at line 15—15 of FIG. 9; FIG. 16, a broken top plan view of the slide and swivel unit mounted on the diagonal tubes and in the normal forward position as shown in FIG. 1; FIG. 17, a view similar to FIG. 14 but showing the seat in the normal revolved position as in FIGS. 3 and 8; FIG. 18, a detailed sectional view, the section being taken as indicated at line 18—18 of FIG. 16; and FIG. 19, a sectional view, the section being taken as indicated at line 19—19 of FIG. 17.

In the illustration given in FIGS. 1-3, the three seats are indicated by the numerals 20, 21 and 22. The bases are the same except that the base 24 for the central seat 21 is designed with relatively straight front and rear sides so as to look proper when the seat is facing in either direction. The bases 25 of seats 20 and 22 face forwardly. When the seat 21 has been rotated to the position shown in FIG. 3, a table 26 may be supported between the seats as indicated.

As shown in FIGS. 4-8 inclusive, a slide plate 27 is shown in dotted lines, and a lever 28 is also shown for moving the slide plate at an angle on the parallel tubes 29 and 30 away from the wall 31. The top seat 21a is shown in FIG. 5 being moved away from the wall and in FIG. 6 partially rotated. In FIG. 7, the rotation is completed, and in FIG. 8 the seat is moved back against the wall 31.

The seat 21 is provided with seat cushions 32 which are shown removed in FIG. 9, and the seat frame 21a is shown provided with four depending lock pins 33, 34, 35 and 36 which support the weight of the seat 21a and make it substantially rigid in the positions where it faces forwardly and rearwardly. Three of the lock pins 33, 34 and 35 rest on platforms or rests 37, 38, and 39, while the fourth lock pin 36 engages a slotted guide 40.

When the seat top 21a is revolved, as shown in FIG. 10, the lock pins 33, 34, 35 and 36 have taken new positions so that now pin 33 is in the slotted guide 40 so as to hold the seat rigid. The slotted guide 40 is parallel to the two diagonal tubes 29 and 30 so that as the slide plate 27 is moved along the tubes, guide pin 33 or 36 can slide easily into and along the slot 48 of the slotted guide 40.

As shown best in FIG. 11, the base support 24 is provided with cross plates 49 and 50 which are on opposite sides of the tubular guides 29 and 30. We provide a locking hook 47 for the lever 28 which is under the cross plate 50. In FIG. 14, the end of the lever 28 is shown resting in the hooked lock 47 and the locked support 51 attached to the underside of the plate 50.

As shown best in FIGS. 11, 12, 13, 16 and 17, the slide plate 27 is provided with a stop bar 41 through which extend adjustment bolts 42 and 43.

Any suitable means for rotatedly supporting the seat 21a upon the slide plate 27 may be provided. In the illustration given, a swivel 44 rotates upon circular ball bearings carried by the structure welded to plate 27, and the plate 45, as shown best in FIGS. 18 and 19, is provided with a depressed pivot stop 46 which strikes the head of the adjustment bolt 42 or 43 to stop the seat motion. In FIG. 18, the pivot stop engages the adjustment bolt 42, while in FIG. 19 the parts have been rotated to bring the adjustment stop 46 into engagement with the adjustment bolt 43. The adjustment bolts 42 and 43 have two functions. They stop the seat at the proper position so that it will be parallel with other seats, but also they stop the revolving seat at the correct spot so that one of the two lock pins (33 or 36) will slide into the slot 48 of the slotted guide 40 when the lever 28 is pushed back under the base 24. There is also provided a stop pin 55 which keeps the seat from moving too far forward.

As shown best in FIGS. 16 and 19, two pipe clamps 52 and 53 attach the plate to the tube 30, while a Z-bracket 54 holds the plate 27 against the other tube 29. This eliminates the necessity of having the two tubes 29 and 30 absolutely parallel, as would be necessary if pipe clamps were used for both tubes.

In the swivel structure shown, the upper member 44 is secured to the seat by bolts 61 from ears 56, the edge of the member 44 extending under nylon washers 57, as shown best in FIGS. 16, 18 and 19.

The lever 28 is pivotally connected at an intermediate point to the threaded flange 58 carried by frame 24, as shown best in FIG. 11, and the inner end of the lever is provided with a vertically-extending portion 59 engaging a slot 60 in the end of slide plate 27.

*Operation*

In the operation of the structure, with the three seats 20, 21 and 22 facing in the same direction, as illustrated in FIGS. 1 and 4, the operator grasps the lever 28 drawing it outwardly, as shown in FIG. 5, thereby moving the slide plate 27 rearwardly along the slide tubes 29 and 30 so that the entire seat swings away from the wall 31. With the seat advanced to the position shown in FIG. 5, the operator can simply rotate the seat to face in the opposite direction. In this operation, the swivel 44 permits the seat to swing around until the stop member 46 engages the adjustment bolt 42 or 43 on the slide plate 27. When the seat is moved to the position shown in FIG. 7, the lever 28 is drawn inwardly to move the seat along the slides 29 and 30 back to a position against the wall 31, and in this operation the lock pin 33 moves into the slot in the member 40 for latching it in a stable position. The other lock pins are simultaneously brought over their respective platforms 37, 38 and 39.

In the foregoing operation, it will be noted that the operator need only swing the lever outwardly to move the seat away from the wall and in a position for rotation, and then to swing the lever inwardly after the rotation has been completed and to bring the seat back to a position against wall 31. Since the lever has its operating end 59 moving in an inclined plane between the guides 29 and 30, a minimum of effort is required to bring about the shifting of the seat away from and toward the wall. The lever is effective at the same time in disengaging the locking pin from the slotted guide 40 which extends in parallel with the inclined guides 29 and 30.

While in the foregoing specification we have set forth a specific embodiment in considerable detail for the purpose of illustrating the invention, it will be understood that such details may be modified widely by those skilled in the art without departing from the spirit of our invention.

We claim:

1. In a revolving transportation seat, a base frame, guide means extending diagonally across said base, a carriage mounted on said guide means, a seat frame rotatably mounted on said carriage, and a lever pivotally mounted on said base frame and connected to said carriage for moving said carriage on said diagonal guide means, said seat frame being provided with a support pin, and said base frame being provided with a slotted guide for receiving said pin to latch said seat upon said base frame, said slotted guide being parallel with said guide means.

2. The structure of claim 1 in which said guide means comprise inclined tubular members.

3. In a revolving transportation seat, a base frame, guide rods extending diagonally across said base, a carriage slidably mounted on said guide rods, a seat frame rotatably mounted on said carriage, and a lever having a central portion pivotally mounted on said base frame and an actuating portion extending inwardly and engaging a slot in said carriage, said seat frame being provided with a depending headed pin and said base frame being provided with a slotted latch member provided with a slot receiving said headed pin, said slotted guide being supported in a position parallel with said guide rods.

4. The structure of claim 3 in which said seat frame is provided with a plurality of depending support pins and said base frame is provided with platforms engaging said pins when said seat frame is rotated to normal seat position.

5. In a revolving transportation seat, a base frame, guide means extending diagonally across said base, a carriage mounted on said guide means, a seat frame rotatably mounted on said carriage, and a lever pivotally mounted on said base frame and connected to said carriage for moving said carriage on said diagonal guide means, said carriage being provided with stop members and said seat frame being provided with a crossbar engageable with said stop members which threadedly engage openings in said bar.

6. In a revolving transportation seat, a base frame, guide means extending diagonally across said base, a carriage mounted on said guide means, a seat frame rotatably mounted on said carriage, and a lever pivotally mounted on said base frame and connected to said carriage for moving said carriage on said diagonal guide means, said guide means being in the form of tubes and said carriage being provided with a U-bracket engaging one guide tube and a Z-bracket engaging another guide tube.

7. In a revolving transportation seat, a base frame, guide rods extending diagonally across said base, a carriage slidably mounted on said guide rods, a seat frame rotatably mounted on said carriage, a lever equipped with a handle and having a central portion pivotally mounted on said base and with an actuating portion extending inwardly of the base, and link connections pivotally connecting said actuating portion and said carriage whereby said handle may be swung outwardly at right angles to said seat base to move said carriage to a rear position on said guide rods and may be swung into a position parallel with and below said base when said carriage is swung to its forward position.

References Cited

UNITED STATES PATENTS

| | | | |
|---|---|---|---|
| 352,268 | 11/1886 | Sauder | 248—425 |
| 972,020 | 10/1910 | Neff | 297—240 |
| 1,876,247 | 9/1932 | Knight | 297—349 |
| 2,472,349 | 6/1949 | Smith | 248—425 |
| 2,781,821 | 2/1957 | Spielman | 248—425 |

FOREIGN PATENTS

| | | |
|---|---|---|
| 409,792 | 5/1934 | Great Britain. |
| 803,697 | 10/1958 | Great Britain. |
| 1,112,317 | 11/1955 | France. |

FRANCIS K. ZUGEL, *Primary Examiner.*